United States Patent
Lerner et al.

(10) Patent No.: US 11,521,442 B2
(45) Date of Patent: Dec. 6, 2022

(54) SYSTEM FOR PREVENTING VEHICLE KEY FOB RELAY ATTACKS

(71) Applicant: FORD GLOBAL TECHNOLOGIES, LLC, Dearborn, MI (US)

(72) Inventors: Jeremy Lerner, Southfield, MI (US); Jochen Schubert, Royal Oak, MI (US); Scott Huggins, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/083,518

(22) Filed: Oct. 29, 2020

(65) Prior Publication Data

US 2022/0139129 A1    May 5, 2022

(51) Int. Cl.
G07C 9/00    (2020.01)

(52) U.S. Cl.
CPC .......... *G07C 9/00174* (2013.01); *G07C 2009/00555* (2013.01); *G07C 2009/00984* (2013.01)

(58) Field of Classification Search
CPC ...... G07C 9/00174; G07C 2009/00555; G07C 2009/00984; G07C 2209/63; G07C 9/28; B60R 25/24; B60R 25/245; B60R 2325/205; H04W 4/029; H04W 4/40; H04W 4/44; H04W 4/46
USPC .............. 340/5.61, 5.72, 8.1, 426.15, 539.13
See application file for complete search history.

(56) References Cited

U.S. PATENT DOCUMENTS

| | | | |
|---|---|---|---|
| 7,292,134 B2 | 11/2007 | Connor et al. | |
| 7,916,021 B2 | 3/2011 | Lickfelt et al. | |
| 9,889,820 B2 | 2/2018 | Yap | |
| 10,101,433 B2 | 10/2018 | Laifenfeld et al. | |
| 10,427,643 B1* | 10/2019 | Casamassima | B60R 25/241 |
| 10,604,114 B2 | 3/2020 | Lin et al. | |
| 2005/0247088 A1* | 11/2005 | Kadouchi | B60R 25/24 |
| | | | 70/271 |
| 2006/0082434 A1* | 4/2006 | Brey | B60R 25/2018 |
| | | | 340/5.6 |

(Continued)

OTHER PUBLICATIONS

Securing smart vehicles from relay attacks using machine learning, by U Ahmad, M Alazab and A Jolfaei; The Journal of Supercomputing; Springer Science+Business Media, LLC, part of Springer Nature 2019; 19 pages <https://www.researchgate.net/publication/336927855>.

*Primary Examiner* — Edwin C Holloway, III
(74) *Attorney, Agent, or Firm* — Michael Spenner; Brooks Kushman P.C.

(57) ABSTRACT

A vehicle subscribed to an authentication system includes a wireless transceiver; and a controller, configured to responsive to receiving a wireless signal from a device identified as a key fob via the wireless transceiver, obtain history data reflecting time and location of the key fob associated with the vehicle detected via one or more entities subscribed to the authentication system, calculate a sanity value using the history data, such that a distant detection location from the vehicle location at a time before present time results in a lesser sanity value and a nearby detection location from the vehicle location at substantially the same time before the present time results in a greater sanity value, calculate a sanity threshold using at least one of the present time and the vehicle location, and responsive to the sanity value being greater than the sanity threshold, unlock a door of the vehicle.

14 Claims, 3 Drawing Sheets

(56) References Cited

U.S. PATENT DOCUMENTS

| | | | |
|---|---|---|---|
| 2010/0090852 A1* | 4/2010 | Eitan | H04W 4/021 |
| | | | 340/686.1 |
| 2015/0161834 A1* | 6/2015 | Spahl | G07C 9/28 |
| | | | 340/5.61 |
| 2015/0310434 A1* | 10/2015 | Cheung | H04W 12/06 |
| | | | 705/44 |
| 2016/0075307 A1* | 3/2016 | Jakobsson | B60R 25/31 |
| | | | 701/2 |
| 2018/0178758 A1 | 6/2018 | Yamaguchi | |
| 2018/0232971 A1* | 8/2018 | Schieke | B60R 25/24 |
| 2019/0044951 A1* | 2/2019 | Zivkovic | H04W 12/08 |
| 2019/0279212 A1* | 9/2019 | Brown | H04W 40/244 |

\* cited by examiner

SYSTEM FOR PREVENTING VEHICLE KEY FOB RELAY ATTACKS

TECHNICAL FIELD

The present disclosure generally relates to a vehicle security system. More specifically, the present disclosure relates to a system for preventing key fob relay attacks to a vehicle.

BACKGROUND

Many vehicles are provided with remote keyless systems (a.k.a. keyless entry) which enables a user to unlock the door and use the vehicle without using a physical key or manually pushing any buttons on a key fob. The key fob may generate a key fob signal responsive to receiving a wireless transmission from the vehicle triggered by a user input (e.g., pressing a button on the door handle). Responsive to verifying the key fob signal, the vehicle may unlock the door and activate an internal vehicle system to allow the user to use the vehicle.

SUMMARY

In one or more illustrative embodiments of the present disclosure, a vehicle subscribed to an authentication system includes a wireless transceiver; and a controller, configured to responsive to receiving a wireless signal from a device identified as a key fob via the wireless transceiver, obtain history data reflecting time and location of the key fob associated with the vehicle detected via one or more entities subscribed to the authentication system, calculate a sanity value using the history data, such that a distant detection location from the vehicle location at a time before present time results in a lesser sanity value and a nearby detection location from the vehicle location at substantially the same time before the present time results in a greater sanity value, calculate a sanity threshold using at least one of the present time and the vehicle location, and responsive to the sanity value being greater than the sanity threshold, unlock a door of the vehicle.

In one or more illustrative embodiments of the present disclosure, a method for a vehicle includes responsive to receiving, via a wireless transceiver, a passive signal from a device, obtaining history data reflecting time and location of a key fob associated with the vehicle detected via one or more entities; calculating, via controller, a sanity value using the history data, such that a distant detection location from the vehicle location at a time before present time results in a lesser sanity value and a nearby detection location from the vehicle location at substantially the same time before the present time results in a greater sanity value; comparing, via a controller, the sanity value with a sanity threshold and conclude a comparison result; and responsive to the sanity value being sufficient according to the comparison result, actuating, via the controller, a vehicle function.

In one or more illustrative embodiments of the present disclosure, a vehicle includes a controller, configured to responsive to receiving a wireless signal from a device identified as a key fob, obtain history data reflecting time and location of the key fob associated with the vehicle detected via one or more entities, calculate a sanity value using the history data, such that a distant detection location from the vehicle location at a time before present time results in a lesser sanity value and a nearby detection location from the vehicle location at substantially the same time before the present time results in a greater sanity value, compare the sanity value with a sanity threshold and conclude a comparison result, and responsive to the sanity value being insufficient according to the comparison result, decline to actuate a vehicle function.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes a vehicle security system for authenticating a vehicle key fob.

Figure 1:
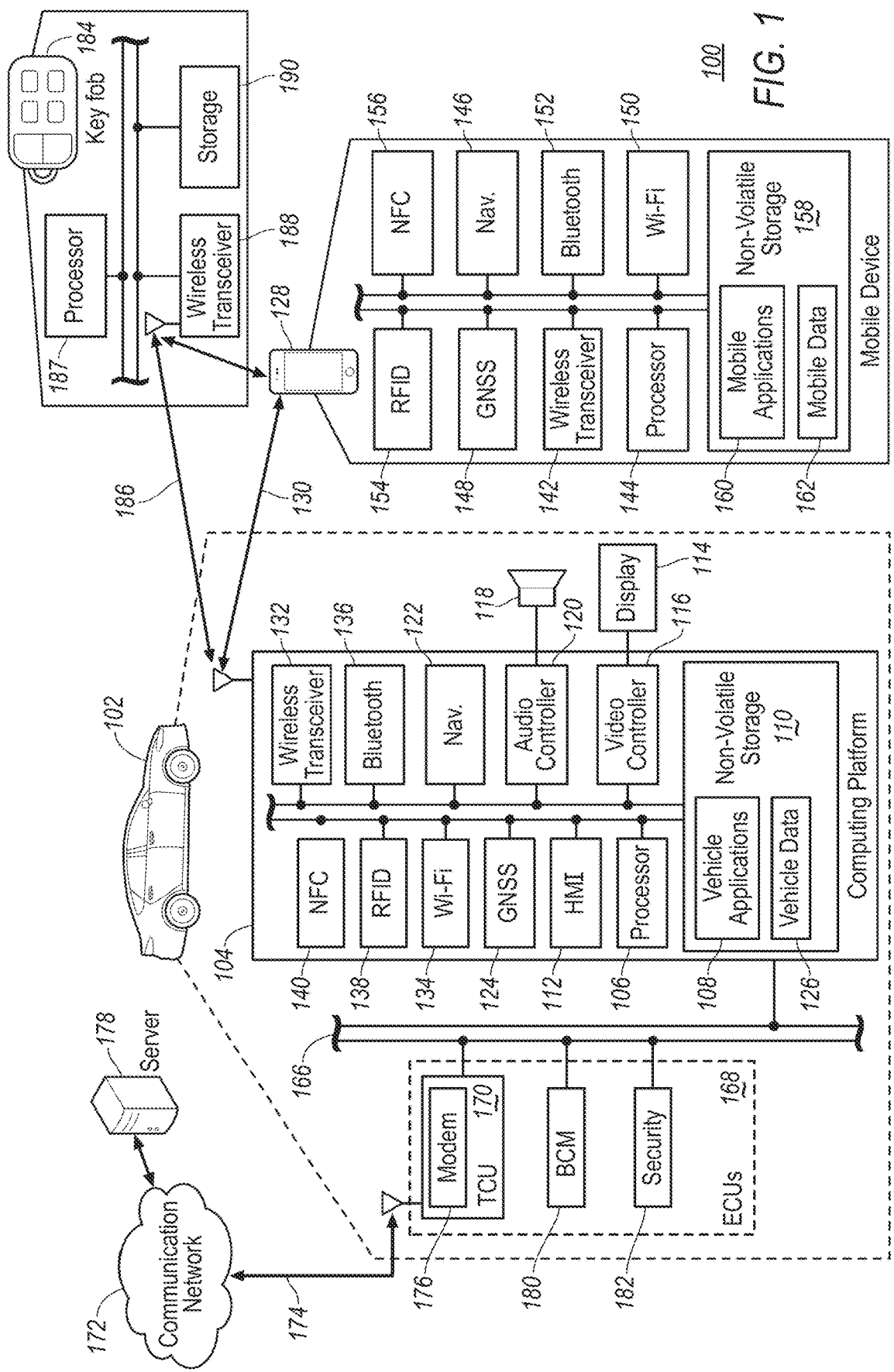
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a battery electric vehicle (BEV), a hybrid electric vehicle (HEV) powered by both an internal combustion engine and one or move electric motors, such as a series hybrid electric vehicle (SHEV), a plug-in hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 106 configured to perform instructions, commands, and other routines in support of the processes described herein. For instance, the computing platform 104 may be configured to execute instructions of vehicle applications 108 to provide features such as navigation, remote controls, and wireless communications. Such instructions and other data may be maintained in a non-volatile manner using a variety of types of computer-readable storage medium 110. The computer-readable medium 110 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from HMI controls 112 configured to provide for occupant interaction with the vehicle 102. As an example, the computing platform 104 may interface with one or more buttons, switches, knobs, or other HMI controls configured to invoke functions on the computing platform 104 (e.g., steering wheel audio buttons, a push-to-talk button, instrument panel controls, etc.).

The computing platform 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 114 may be a display only, without touch input capabilities. The computing platform 104 may also drive or otherwise communicate with one or more speakers 118 configured to provide audio output and input to vehicle occupants by way of an audio controller 120.

The computing platform 104 may also be provided with navigation and route planning features through a navigation controller 122 configured to calculate navigation routes responsive to user input via e.g., the HMI controls 112, and output planned routes and instructions via the speaker 118 and the display 114. Location data that is needed for navigation may be collected from a global navigation satellite system (GNSS) controller 124 configured to communicate with multiple satellites and calculate the location of the vehicle 102. The GNSS controller 124 may be configured to support various current and/or future global or regional location systems such as global positioning system (GPS), Galileo, Beidou, Global Navigation Satellite System (GLONASS) and the like. Map data used for route planning may be stored in the storage 110 as a part of the vehicle data 126. Navigation software may be stored in the storage 110 as one the vehicle applications 108.

The computing platform 104 may be configured to wirelessly communicate with a mobile device 128 of the vehicle users/occupants via a wireless connection 130. The mobile device 128 may be any of various types of portable computing devices, such as cellular phones, tablet computers, wearable devices, smart watches, smart fobs, laptop computers, portable music players, or other device capable of communication with the computing platform 104. A wireless transceiver 132 may be in communication with a Wi-Fi controller 134, a Bluetooth controller 136, a radio-frequency identification (RFID) controller 138, a near-field communication (NFC) controller 140, and other controllers such as a Zigbee transceiver, an IrDA transceiver, a ultra-wideband (UWB) controller (not shown), and configured to communicate with a compatible wireless transceiver 142 of the mobile device 128.

The mobile device 128 may be provided with a processor 144 configured to perform instructions, commands, and other routines in support of the processes such as navigation, telephone, wireless communication, and multi-media processing. For instance, the mobile device 128 may be provided with location and navigation functions via a navigation controller 146 and a GNSS controller 148. The mobile device 128 may be provided with a wireless transceiver 142 in communication with a Wi-Fi controller 150, a Bluetooth controller 152, a RFID controller 154, an NFC controller 156, and other controllers (not shown), configured to communicate with the wireless transceiver 132 of the computing platform 104 and with one or more servers 178 using a communication network 172 through a wireless connection (not shown). The wireless connection may be in the form of various network e.g., a cellular network. The mobile device 128 may be further provided with a non-volatile storage 158 to store various mobile application 160 and mobile data 162.

The computing platform 104 may be further configured to communicate with various components of the vehicle 102 via one or more in-vehicle network 166. The in-vehicle network 166 may include, but is not limited to, one or more of a controller area network (CAN), an Ethernet network, and a media-oriented system transport (MOST), as some examples. Furthermore, the in-vehicle network 166, or portions of the in-vehicle network 166, may be a wireless network accomplished via Bluetooth low-energy (BLE), Wi-Fi, UWB, or the like.

The computing platform 104 may be configured to communicate with various ECUs 168 of the vehicle 102 configured to perform various operations. For instance, the computing platform 104 may be configured to communicate with a TCU 170 configured to control telecommunication between vehicle 102 and a communication network 172 through a wireless connection 174 using a modem 176. The wireless connection 174 may be in the form of various network e.g., a cellular network. Through the communication network 172, the vehicle may access one or more servers 178 to access various content for various purposes. It is noted that the terms communication network and server are used as general terms in the present disclosure and may include any computing network involving carriers, router, computers, controllers, circuitry or the like configured to store data and perform data processing functions and facilitate communication between various entities. The ECUs 168 may further include a vehicle body control module (BCM) 180 configured to control body operations of the vehicle 102 such as doors lock/unlock, windows up/down or the like. The ECUs 168 may further include a vehicle security controller 182 configured to operate security features of the vehicle 102. The security controller 182 may communicate with a wireless key fob 184 via the wireless link 186 through the wireless transceiver 132 and perform authentications to wireless signals received. Responsive to a successful authentication, the security controller 182 may activate features of the vehicle 102 such as unlocking the doors via the BCM 180.

The key fob 184 may be provided with a processor 187 configured to perform instructions, commands, and other routines in support of the processes such as remote controls. The key fob 184 may communicate with the vehicle 112 as well as the mobile device 128 via a wireless transceiver 188 using compatible wireless protocols. For instance, the key fob 184 may be paired with the vehicle 102 to perform remote controls responsive to a user input to key fob (e.g., button). Additionally, the key fob 184 may be provided with the keyless entry feature configured passively transmit a wireless signal responsive to receiving a signal request from the vehicle 102 triggered by a user input to the vehicle 102 (e.g., door handle, start button). The pairing information may be stored in a non-volatile storage 190 provided to the key fob 184. The key fob 184 may be paired or associated with a variety of entities provided with wireless communication capabilities. For instance, the key fob 184 may be associated with the mobile device 128, a base station, and/or one or more fleet vehicles to provide enhanced security features (to be discussed in detail below). It should be noted that the term key fob used in the present disclosure may refer to any devices provided with wireless communication capabilities configured to communicate and/or operate features of the vehicle 102. As a few non-limiting examples, the key fob 184 may include a traditional vehicle key having remote control features, a digital fob with or without a physical key provide with the keyless entry feature, and a mobile device provided with software to communicate with the vehicle 102.

Figure 2:
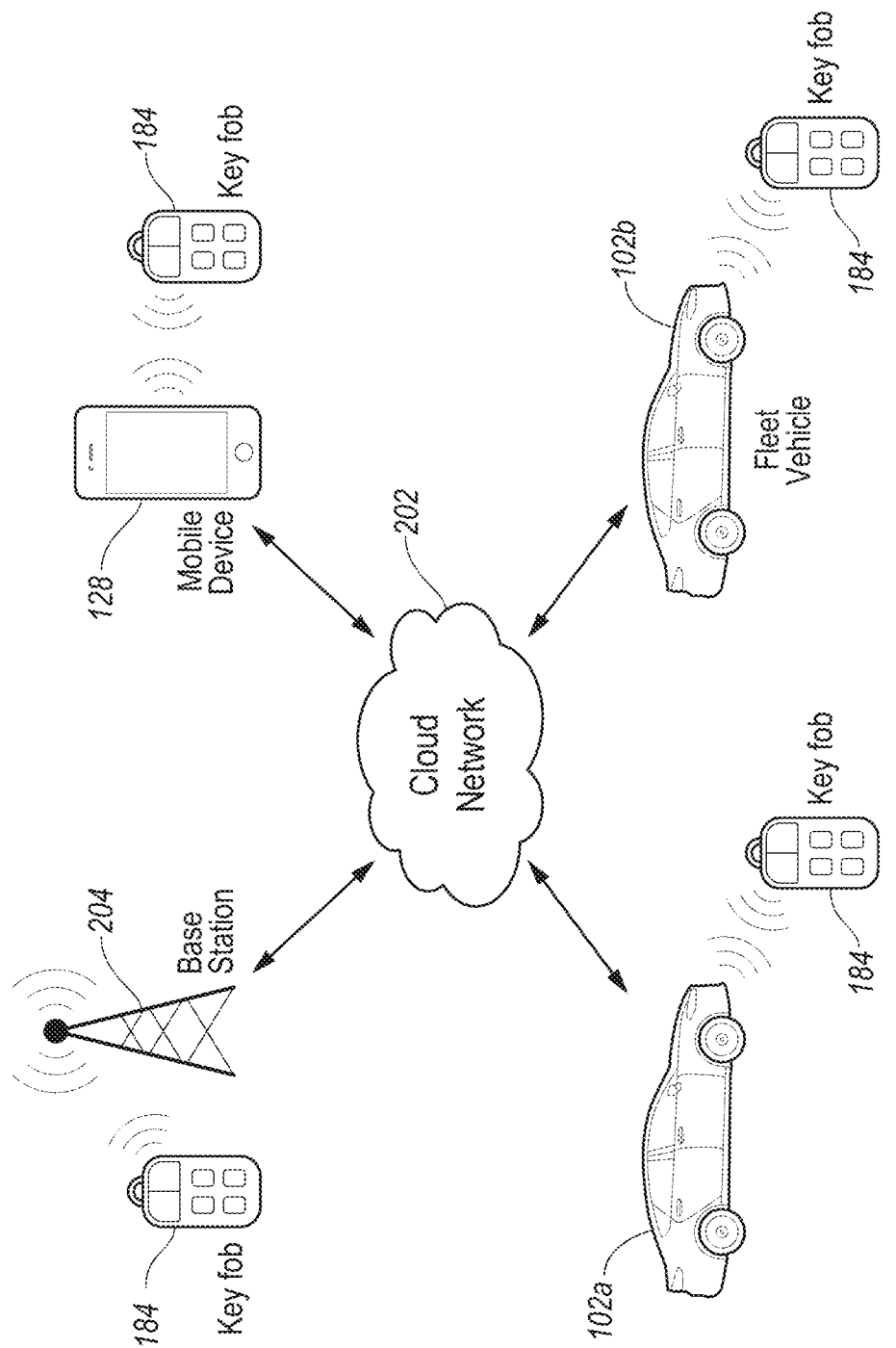
FIG. 2 illustrates an example schematic diagram of a vehicle authentication system of one embodiment of the present disclosure.

Referring to FIG. 2, a schematic diagram of the vehicle authentication system 200 of one embodiment of the present disclosure is illustrated. With continuing reference to FIG. 1, a key fob 184 may be associated with a vehicle 102a and have the authority to remotely control the operation of the vehicle 102a (e.g., unlock, remote start). The vehicle 102a may be configured to communicate various entities via a cloud network 202. The cloud network 202 is used as a general term in the present disclosure and may include one or more of the communication network 172 and the server 178 to coordinate the communications between various entities described herein. The vehicle 102a may be configured to communicate with cloud network 202 via one or more of V2V, V2X messaging through wireless connections such as dedicated short-range communication (DSRC), 5G or the like. Alternatively, one or more local wireless networks such as Wi-Fi, Bluetooth, radio-frequency (RF) network, or the like may be used to perform substantially the same features in addition to or in lieu of the cloud network 202. Each of the various entities may be provided with capabilities to collectively or individually communicate with the key fob 184. The vehicle 102a may use the information received from the various entities to determine the location of the key fob 184 and identify possible relay attacks.

For instance, the vehicle 102a may communicate with one or more fleet vehicles 102b via the cloud network 202. Additionally or alternatively, the vehicle 102a may communicate with fleet vehicle 102b via a direct link (not shown) when the vehicles are located near each other. The fleet vehicle 102b may be any vehicles provided with compatible software and transceivers to communicate with the vehicle 102a via the cloud network. As an example, the fleet vehicle 102b may be a vehicle manufactured by the same manufacturer as the vehicle 102a, although the different manufacturers may be provided with compatible hardware and software to enable the communication under substantially the same concept. The vehicle 102a may further communicate with one or more mobile device 128 via the cloud network 202 or via a direct connection 130 as discussed above. The vehicle 102a may be further configured to communicate with a base station 204 via the cloud network 202. Additionally or alternatively, the vehicle 102a may communicate with the base station via a direct wireless link (not shown) via communication technologies such as DSRC and cellular vehicle-to-everything (CV2X). The base station 204 may be implemented in various manners. As an example, the base station 204 may be a computing device that provides wireless communication capabilities to communicate with the key fob 184, the cloud network 202, and the vehicle 102a. The base station 204 may be installed at a fixed location such as the home or office of the vehicle user where the key fob 184 often is present. Alternatively, the base station 204 may be one of several publicly operated V2X devices installed in locations such that the base stations may be able to communicate with the key fob 184, the cloud network 202, and the vehicle 102a. The location of the base station 204 may be manually set upon installation as the base station 204 does not move very often. Alternatively, the base station 204 may be mobile and provided with location features (e.g., GNSS system) to automatically update the location. For instance, the mobile base station 204 may be installed on a second vehicle of the same household if the vehicle 102a is for personal use, or installed on a second work vehicle under the same management if the vehicle 102a is for business use.

Although detailed implementation and features of each entity illustrated in FIG. 2 may vary, the vehicle authentication process may be performed in a substantial similar manner. For instance, responsive to receiving a wireless transmission from the device that is identified as the key fob 184 paired with the vehicle requesting to unlock the doors, the vehicle 102a may cross verify the location of the key fob 184 through at least one of the entities illustrated in FIG. 2 before proceeding to execute the command (e.g., unlock the door, start the vehicle). The location of the key fob 184 relative to other entities, such as the vehicle 102a or the base station 204, may be determined through the presence of wireless transmissions, a calculated RSSI-based trilateration, or more advanced ranging that may leverage technology such as Bluetooth angle of arrival or angle of departure. Here, the wireless transmission from the self-identified key fob 184 may be a passive keyless entry signal which may be generated by the key fob 184 responsive to receiving an authentication signal from the vehicle and more vulnerable to relay attacks due to the passive nature in general. The vehicle 102a may determine the current location of the vehicle 102a is far from the base station 204 (e.g., 2 miles away) whose location is known to the vehicle 102a through fixed location information, shared positioning data (e.g. GNSS), or information supplied to the vehicle 102a by a server 178. However, if the vehicle 102a verifies that the base station just detected signal transmissions from the key fob 184 a short time ago (e.g., a few seconds ago) indicating the key fob 184 is left near the base station 204 (e.g., at home), the authenticity of the command received by the vehicle 102a may be suspicious, i.e., the command may be from a phantom key fob from an attacker because it is unlikely for the key fob 184 to travel a few miles to the vehicle 102a in just a few seconds. In this case, the vehicle 102a may refuse to unlock the doors and report the possible attack to the vehicle user. The security of the system may be further enhanced by operating the authentication process in a "crowd-sourcing" manner through fleet vehicles 102b as well as mobile devices 128. The mobile device 128 may include devices that is not associated with the vehicle user. For instance, a user of the fleet vehicle 102b may have his/her mobile device 128 enabled for the crowd sourcing detection described herein. This "crowd-sourced" authentication process may also be further enhanced with public V2X devices operating as additional base stations 204.

Figure 3:
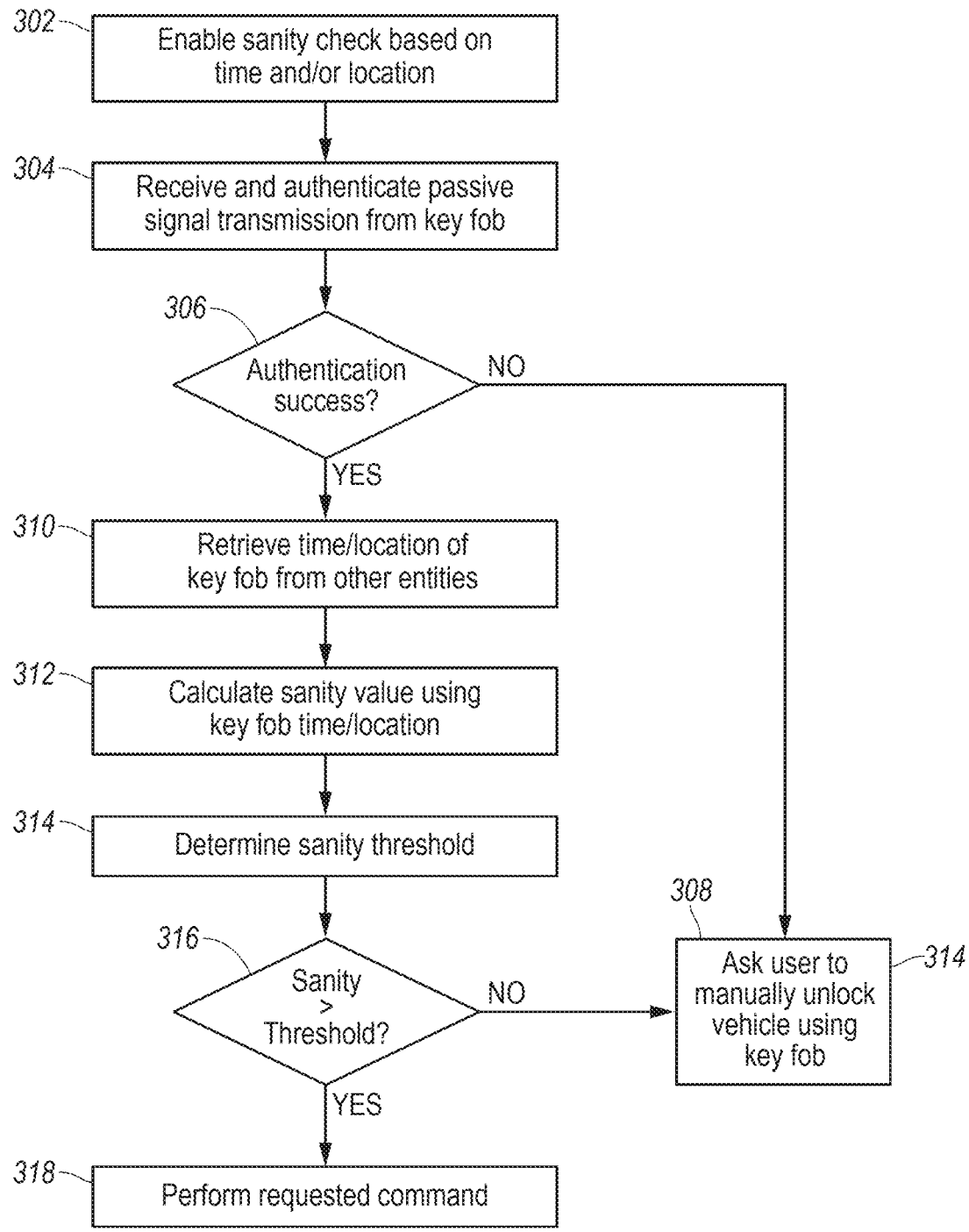
FIG. 3 illustrates an example flow diagram of a vehicle authentication process of one embodiment of the present disclosure.

Referring to FIG. 3, an example flow diagram for an authentication process 300 of one embodiment of the present disclosure is illustrated. The present authentication process may be referred to as key fob sanity authentication or sanity check. With continuous references to FIGS. 1 and 2, the authentication process 300 may be enabled responsive to time and/or location conditions being met at operation 302. The vehicle 102 may be configured to only enable the sanity authentication within a predetermined geo-fence and/or time frame. For instance, the vehicle 102 may be configured to enable the sanity authentication feature responsive to entering a predetermined area (e.g., high-crime area) and disable the sanity authentication feature upon leaving the area. Additionally or alternatively, the vehicle 102 may be configured to enable the sanity authentication feature at night (e.g., between 11 PM and 5 AM) when most vehicle theft activities happen. Alternatively, the vehicle 102 may be configured to constantly enable the sanity authentication feature to provide extra security. A sanity check threshold may be used to verify the authenticity of the key fob 184. The vehicle 102 may be configured to vary the sanity check threshold depending on the time/location while having the sanity authentication feature enabled to provide the extra security while not overburdening the system and cause significant lags affecting user experience (to be described in detail below). At operation 304, responsive to receiving a passive signal transmission from a device which identifies itself as one of the key fobs 184 paired with the vehicle 102, the vehicle 102 verifies and authenticate the passive signal. If the authentication fails, indicating the signal is not from an authorized device to access the vehicle 102, the vehicle 102 declines to open the doors or start the engine. Additionally, the process may proceed to operation 308 to ask the user to manually unlock the vehicle using by pressing a button on the key fob 184. Additionally or alternatively, the vehicle 102 may output a message via an interface to invite the user to perform a secondary authentication such as to manually input a passcode via a keypad (if provided) and/or to input a passcode via a mobile device associated with the vehicle 102.

If the authentication is successful, the process proceeds from operation 306 to operation 310 to perform the sanity check by retrieving the time and location of the key fob detected by other entities as described with references to FIG. 2. Responsive to retrieving the time and location of the key fob from one or more entities, the vehicle 102a processes the data to calculate a sanity value at operation 312. The sanity value may be calculated as a function of the last detected time and distance from the current time and location of the vehicle 102. In general, the sanity value may be calculated to reflect how likely the legitimate key fob 184 is to be at the current vehicle location at the current time based on the past time and location detected by various entities. A detection at a short distance away from the vehicle 102 short time ago may generally result in a high sanity value, whereas a detection far away from the vehicle 102 a short time ago may generally result in a low sanity value. To increase the calculation accuracy, detection made a short time ago may be given more weight, as detections made a long time ago may be stale and not very accurate. The following table illustrates and example of the sanity value calculation.

TABLE 1

An example of time/location data retrieved

| Events | Distance between sensing entity and the vehicle | Time since event |
| --- | --- | --- |
| Base station detected key fob A entered range (about 20 feet) | 5 miles | 3 hours |
| Base station detected key fob A left range | 5 miles | 2.5 hours |
| Fleet vehicle detected key fob A entered/left the range | 100 feet | 5 minutes |
| Base station detected key fob B entered range (about 30 feet) | 5 miles | 14 hours |
| Base station detected key fob C near the station (about 25 feet), current location unknown | 5 miles | 5 minutes |

As illustrated in Table 1, the vehicle 102 may be associated more than one key fobs 184 in the present example. The key fobs A and B may be both paired with the vehicle 102a. The data as retrieved may indicate the base station 204 located 5 miles away from the current location of the vehicle 102 detected the key fob A entered the based station transmission range around 3 hours ago and left the transmission range around 2.5 hours ago. The most recent detection indicates the key fob A entered and left the transmission range of a fleet vehicle about 100 feet away from the current location of the vehicle 102 about 5 minutes ago. In this example, the vehicle 102 may determine that the key fob A is legitimately present within the transmission range of the vehicle 102 and allows the doors to be unlocked. the detection by the fleet vehicle may be given more weight as the detection is closer to the present time. In contrast, the key fob B may be detected by the base station 204 about 14 hours ago and never left the transmission range of the base station 204. In this case, the key fob B is likely a phantom device in a relay attack. Each entity configured to detect the key fobs 184 may be configured to only update the key fob location responsive to detecting a location change. Taking the above key fob B for instance, because the location of the key fob B does not change since entered the transmission range of the base station 204 about 14 hours ago, no update status is reflected in the table. Alternatively, the base station 204 may be configured to periodically refresh (e.g. every 5 minutes) the entity detections within the transmission range of the base station 204. In other words, the location of the key fob does not update by a change of the location, but by a periodical refresh by the base station 204. Taking the key fob C illustrated in the table for instance, the key fob C is last detected by the base station 204 located 5 miles away around 5 minutes ago, and the current location of the key fob C is unknown. In this case, the key fob C is still likely a phantom device in a relay attack because it is unlikely for the key fob C to travel 5 miles in 5 minutes time from the base station 204 to the vehicle 102a.

Additionally, the various detecting entities may be given different weight for the sanity value calculation. For instance, the entities directly associated with the vehicle 102 such as the base station 204 and the mobile device 128 of the vehicle user may be given more weight in the sanity value calculation. Additionally or alternatively, more weight may be given to the entity that is directly connected to the vehicle 102. Taking the fleet vehicle illustrated in the above table for instance, the vehicle 102 may receive the key fob detection from the fleet vehicle via a direct link because the vehicles are 100 feet apart within transmission range of various wireless protocols (e.g., Wi-Fi, Bluetooth, NFC). In this case, the detection by the fleet vehicle may be given more weight because the data may be more accurate.

At operation 314, the vehicle 102 determines a sanity threshold for authentication purposes. The sanity threshold may be calculated based on various factors reflecting the specific usage situation. For instance, the sanity threshold may be determined based on the location of the vehicle and the time when the passive signal is received. A higher sanity threshold may be determined if the time and location indicate the vehicle is more subject to relay attacks (e.g., high crime area at night). A lower sanity threshold may be used if the time and location indicate a safer area/time. At operation 316, if the vehicle verifies the sanity value is greater than a predetermined threshold, the process proceeds to operation 318 to perform the requested command such as opening the doors. Otherwise, if the vehicle 102 determines the sanity value is insufficient to verify the legitimacy of the key fob 184, the process proceeds to operation 308 and the vehicle 102 may output a message or other indication (e.g. light flash, horn chirp, etc.) to inform the user to manually unlock the vehicle doors using the key fob 184. The message may be directly sent to the key fob 184 to invite the user to make the manual input. For instance, the key fob 184 may be implemented using a smart phone provided with interface and input/output capabilities. Alternatively, the vehicle 102 may output the message to the mobile device 128 associated with the user to ask the user to make a permission via the mobile device 128 to unlock the doors. The mobile device 128 in this case does not need to be near the vehicle 102. For instance, the vehicle owner may lend the key fob 184 to a friend and remotely unlock the door if the sanity check fails.

In general, the passive keyless entry feature is more subject to relay attacks because the key fob passive transmission may be more easily relayed. However, when an unlock request responsive to a manual input to one of the key fob buttons is issued, the unlock request signal may be encrypted and may not be easily reproduced. The direct unlock request signal may only be reproduced when the unlock button is actually pressed. Furthermore, each unlock request may be provided with a unique code on a rolling bases making it more difficult to reproduce. The process 300 described above may be implemented via various components of the vehicle 102. For instance, the process 300 may be performed via the security controller 182 and/or the computing platform 104 individually or in combination with other components of the vehicle 102 described or not described herein under substantially the same principle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle subscribed to an authentication system, comprising:
   a wireless transceiver; and
   a controller, configured to
      responsive to receiving a wireless signal from a device identified as a key fob via the wireless transceiver, obtain a first history data indicative of a first time and a first location of the key fob associated with the vehicle detected via one or more entities subscribed to the authentication system via a wide-area network,
      obtain a second history data indicative of a second time and second location of the key fob from a second entity via a direct wireless connection,
      calculate a sanity value using the first and second history data, wherein the second history data obtained via the direct wireless connection is assigned with greater weight compared with the first history data obtained via the wide-area network,
      calculate a sanity threshold using at least one of the present time and the vehicle location, and
      responsive to the sanity value being greater than the sanity threshold, unlock a door of the vehicle.

2. The vehicle of claim 1, wherein the controller is further configured to:
   responsive to the sanity value being less than the sanity threshold, output a message to the key fob to ask a user to manually unlock the door using the key fob.

3. The vehicle of claim 1, wherein the controller is further configured to:
   responsive to detecting the vehicle is within a predetermined geofence, enable to calculate the sanity value and sanity threshold.

4. The vehicle of claim 1, wherein the controller is further configured to:
   responsive to the present time being within a predetermined time frame, enable to calculate the sanity value and sanity threshold.

5. The vehicle of claim 1, wherein the controller is further configured to:
   authenticate the wireless signal received from the device.

6. The vehicle of claim 1, wherein the controller is further configured to:
   obtain the first history data from a remote server.

7. A method for a vehicle, comprising:
   responsive to receiving, via a wireless transceiver, a passive signal from a device, obtaining a first history data reflecting a first time and a first location of a key fob associated with the vehicle detected via a first entity via a communication network;
   obtain a second history data indicative of a second time and second location of the key fob from a second entity via a direct wireless connection,
   calculating, via controller, a sanity value using the first and second history data, wherein the second history data is assigned with greater weight compared with the first history data;
   comparing, via a controller, the sanity value with a sanity threshold and conclude a comparison result; and
   responsive to the sanity value being sufficient according to the comparison result, actuating, via the controller, a vehicle function.

8. The method of claim 7, further comprising:
   adjusting the sanity threshold using the present time and the vehicle location.

9. The method of claim 7, further comprising:
responsive to the sanity value being insufficient according to the comparison result, outputting a message to a mobile device associated with the vehicle to ask a user to manually grant a permission to unlock the door using the mobile device.

10. The method of claim 7, further comprising:
responsive to detecting the vehicle is within a predetermined geofence, enabling to calculate the sanity value and sanity threshold.

11. The method of claim 7, further comprising:
responsive to the present time being within a predetermined time frame, enabling to calculate the sanity value and sanity threshold.

12. A vehicle, comprising:
a controller, configured to
responsive to receiving a wireless signal from a device identified as a key fob, obtain history data reflecting time and location of the key fob associated with the vehicle detected via one or more entities,
calculate a sanity value using the history data, such that a first detection at a first time before present time and obtained via a communication network is assigned with less weight than a second detection at a second time later than the first time and obtained via a direct wireless connection,
compare the sanity value with a sanity threshold and conclude a comparison result, and
responsive to the sanity value being insufficient according to the comparison result, decline to actuate a vehicle function.

13. The vehicle of claim 12, wherein the controller is further configured to:
obtain the sanity value and the sanity threshold from a remote device.

14. The vehicle of claim 12, wherein the controller is further configured to:
responsive to the sanity value being insufficient according to the comparison result, output a message to ask a user to unlock the door manually using the key fob.

* * * * *